United States Patent [19]

Garber, Jr. et al.

[11] 4,208,734
[45] Jun. 17, 1980

[54] UNDERWATER COMMUNICATION SYSTEM

[75] Inventors: Samuel M. Garber, Jr., Syracuse; James H. Donegan, North Syracuse, both of N.Y.

[73] Assignee: General Electric Company, Syracuse, N.Y.

[21] Appl. No.: 559,566

[22] Filed: Jan. 17, 1956

[51] Int. Cl.² .......................................... H04B 11/00
[52] U.S. Cl. .................................. 367/134; 367/904; 178/22; 179/1.5 R; 375/2
[58] Field of Search ..................... 340/3, 5 T, 5 R, 5, 340/6; 235/61 CF, 181; 343/17, 100.7, 228; 179/1.5, 1.5 R; 178/22; 250/6.6, 6.410, 6.411, 13 C; 325/34

[56] References Cited

U.S. PATENT DOCUMENTS

| 2,401,403 | 6/1946 | Bedford | 179/1.5 |
| 2,401,404 | 6/1946 | Bedford | 179/1.5 |
| 2,401,406 | 6/1946 | Bedford et al. | 179/1.5 |
| 2,423,546 | 7/1947 | Bedford | 179/1.5 |

OTHER PUBLICATIONS

Page, IRE PGII, 1953 Convention Record of the Ire, Part 8, Information Theory, pp. 22–23.
George, Proc. of Nat'l, Elec't Conf., vol. X, 1954, Feb. 8, 1955, pp. 109–118.

Primary Examiner—Richard A. Farley
Attorney, Agent, or Firm—Carl W. Baker

EXEMPLARY CLAIM

1. In combination, means to generate a first noise signal having predetermined characteristics, means to generate a second noise signal having predetermined characteristics different from that of said first noise signal, means to generate a carrier wave, means to generate a message signal, means to modulate said first noise signal with said carrier wave in the presence of said message signal to derive a first modulated wave, means to modulate said second noise signal with said carrier wave in the absence of said message signal to derive a second modulated wave, means to suppress said carrier wave in said first and second modulated wave, means to transmit at least one sideband of said first or second modulated wave, means to receive said transmitted wave, means for generating a second carrier wave, means for heterodying said received wave against said second carrier to derive a resultant signal of desired frequency, means for generating a third noise signal having the same amplitude characteristics as said first noise signal on a controllably variable time base, means for generating a fourth noise signal having the same amplitude characteristics as said second noise signal on a controllably variable time base, means for starting said third and fourth noise generators at the same point on the predetermined characteristic as the first and second noise generators, means for starting said third and fourth noise generators at a time determined by reception of said received wave, means for controlling the time base of said third and fourth noise signal to be identical with the time base of said first and second noise signal as received by the receiver, means for correlating said received wave with said third and fourth noise generator to derive said message signal.

3 Claims, 4 Drawing Figures

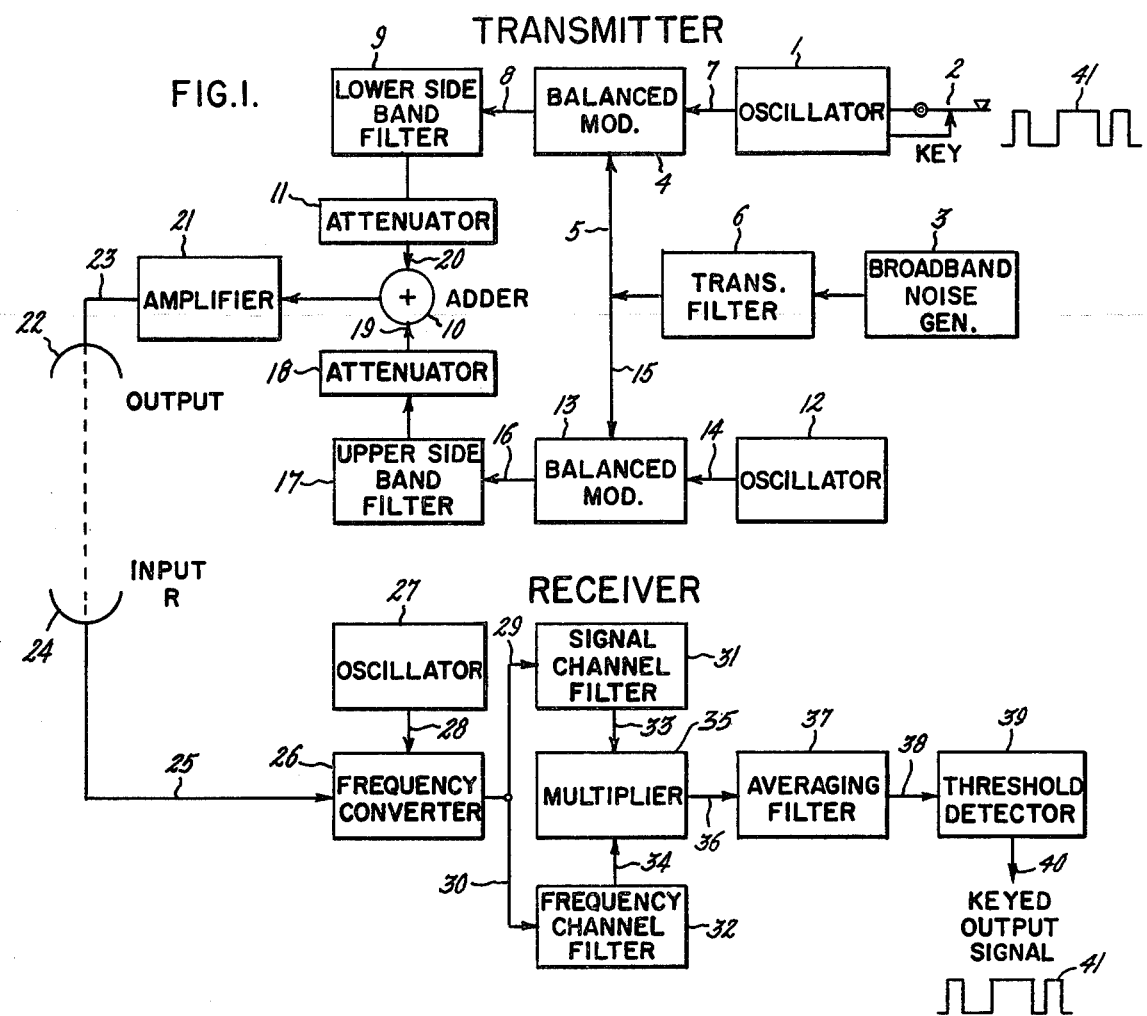
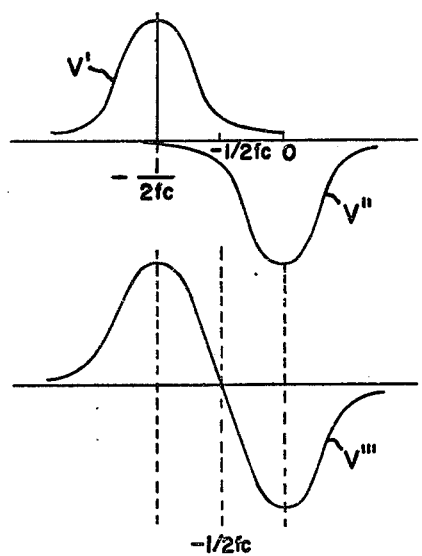
FIG.4.

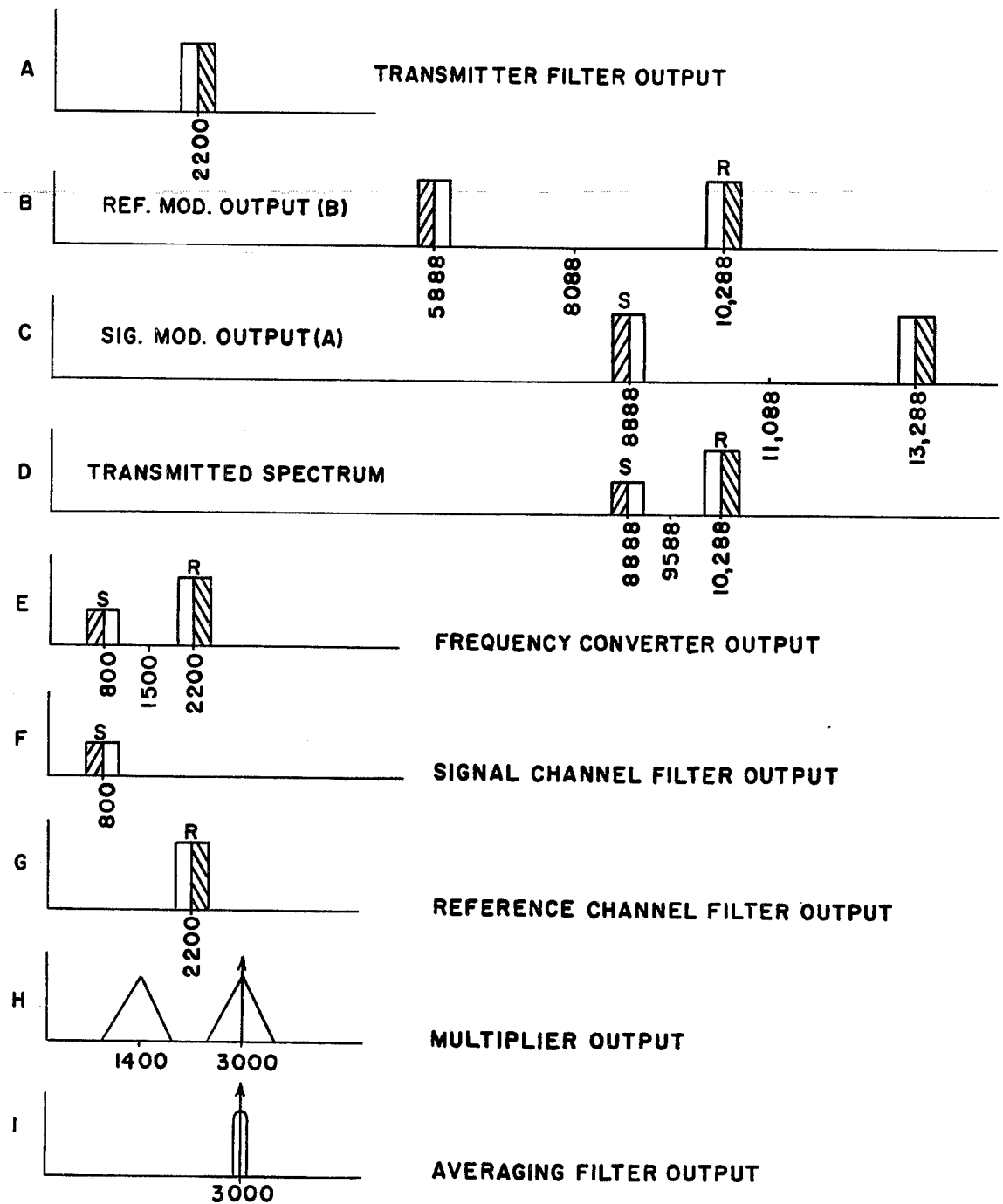

UNDERWATER COMMUNICATION SYSTEM

This invention relates to the art of signal communication and more particularly to the art of underwater communication using techniques of correlation detection.

Underwater detection of objects by echo-ranging principles poses the problem of discovery. It would be desirable to employ a passive technique for detection by making triangulation measurements from two listening underwater stations, such as submarines. For triangulation ranging, however, it is necessary that the two submarines be in communication with each other and this communication must be undetectable to the object to preserve security. The development of a secure underwater communication system would thereby greatly increase the effectiveness of submarines.

A present underwater communication makes use of a voice modulated compressional wave. Previously, no major attempt has been made at security of message communication from a listening post at the object, such that the communication uses have been limited principally for experimental purposes.

It is therefore one object of our invention to provide method and means of underwater communication which have improved security from interception coupled with a desirable degree of reliability of transmitted information.

It is a further object of our invention to provide an improved communication method and means.

It is another object of our invention to provide improvements in or relating to signal processing arrangements.

In accordance with these objects, we have provided in one embodiment of our invention, a system for the transmission and reception of a noise signal modulated by an intelligence signal and the derivation of the receiver of the intelligence by correlation of the received signal with a stored noise signal available at the receiver.

In a modification of our invention, we provide for the transmission of a reference noise signal and a noise signal modulated by intelligence and derivation of the intelligence at the receiver by correlation of the transmitted reference noise and the transmitted noise modulated by the intelligence signal.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawings, in which:

FIG. 1 is a block diagram of a communication system in accordance with on embodiment of this invention;

FIG. 2 shows spectra of the operating characteristics at various portions of the circuit of FIG. 1;

FIG. 4 shows operating characteristics of various portions of the circuit of FIG. 3.

Figure 3:
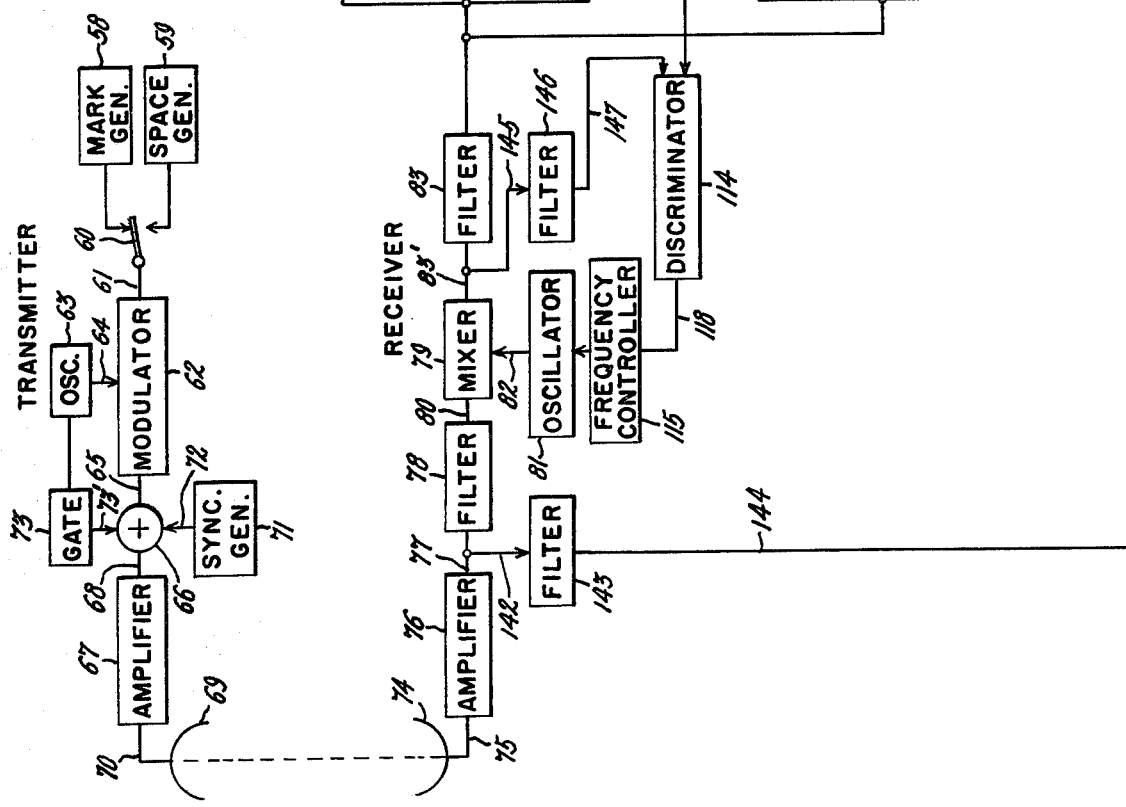
FIG. 3 is a block diagram of a communication system in accordance with another embodiment of our invention.

In FIG. 1 there is shown a continuous wave source 1 which is adapted to provide waves of differing frequency in accordance with the opening and closing of the contacts of keyer 2. Noise signals from source 3 are supplied to balanced modulators 4 over lead 5 after passage through a frequency limiting filter 6. The filtered noise signals are modulated in 4 with the signals available over lead 7 from the continuous wave source 1 to provide noise amplitude modulated continuous waves at output lead 8. Modulator 4 is preferably of the type which suppresses the waves supplied over lead 7 and delivers only the modulation sidebands to lead 8. Filter 9 operates to effectively pass only a single preferred sideband of the modulated waves available over lead 8 to adder circuit 10 through an attenuator 11.

Source 12 supplies continuous waves of a frequency different from those available from source 1 to modulator 13 over lead 14. The frequency limited noise available from filter 6 is supplied over lead 15 to modulator 13 for modulating the waves available from source 12. Modulator 13 is preferably of the balanced type which suppresses the waves supplied over lead 14 and delivers only the modulation sidebands to lead 16. Filter 17 operates to effectively pass only a single preferred sideband of the modulated waves available over lead 16 to adder circuit 10 through an attenuator 18.

The signals applied to adder 10 over leads 19 and 20 are added, then amplified in amplifier 21 and delivered to projector 22 over connection 23.

The signal transmitted by the projector 22 is received by hydrophone 24 and applied over connection 25 to a frequency converter 26. The frequency converter heterodynes the received signal with the signal derived from the oscillator 27 over line 28 to a desired resultant frequency. The heterodyned signal is applied over leads 29 and 30 to channel filters 31 and 32. The signal channel filters operate to separate the signals attributed to operation of modulator 4 from the signals attributed to operation of modulator 13 and to apply two separated signals over respective leads 33 and 34 to multiplier 35. Multiplier 35 multiplies the separated signals. Multiplier 35 is preferably of the type in which one input phase modulates a carrier and the second input amplitude modulates another. Both carriers are then applied to a conventional phase sensitive detector to give a multiplier output voltage proportional to the phase between the two input carriers and to the amplitude of the smaller ones. The output from the multiplier is applied over connection 36 to an averaging filter 37 for correlation detection. The averaging filter is preferably a high Q averaging filter having a narrow bandpass. It is, in a preferred embodiment, essentially a unity gain amplifier with selective variable feedback using a series tuned Clapp circuit used in conjunction with a high Q toroidal coil to attain frequency stability. Application of the output of the averaging filter over lead 38 to a threshold detector 39 will then provide an output signal on line 40, represented by the illustrative waveform 41 which is identical with that transmitted by the keyer 2 in the transmitter system. The threshold detector provides a constant DC output whenever the input sine wave goes above a predetermined threshold in a well known manner.

In one embodiment, source 1 comprised an oscillator whose frequency was shifted between 11,088 and 11,148 cycles per second in accordance with the operation of keyer 2. Filter 6 operated to pass approximately a 500 cycle bandwidth of noise signals centered at a frequency of 2200 cycles per second. Filter 9 operated to pass the lower sideband of center frequency of 8,888 cycles per second of the output of 4. Source 12 delivered an 8,088 cycles per second reference signal, and filter 17 delivered the sideband adjacent to that available from 9 which was the upper sideband of center frequency of 10,288 cycles per second available from 13. Attenuator 11 and 18 adjust the reference modulation available from 9 and 17 respectively to provide signal amplitudes suitable for optimum detector at the receiver.

The operation of the circuitry shown in FIG. 1 may best be understood by reference to FIG. 1 and FIG. 2, which shows operating characteristics of various portions of the circuit shown in FIG. 1, wherein the envelopes of signal amplitude are plotted as abscissa and frequency is plotted as ordinates. The output of the broad band noise generator 3 after passing through the transmitter filter 6 takes the form shown in FIG. 2a as being the spectra of signals available on connections 5 and 15. The spectra illustrated by FIG. 2a is that of continuous noise available from filter 6 and having a bandwidth of approximately 500 cycles about a center frequency of 2200 cycles. The cross hatched area on the spectra shown in FIG. 2a represents the upper bandwidth of the spectra with respect to its center frequency.

The spectra as shown in FIG. 2a is then applied to the balanced modulator 13 with a suppressed carrier at 8,088 cycles per second to give the spectra shown in FIG. 2b having an upper sideband with a center frequency of 10,288 cycles per second and equivalent lower sideband. The spectra shown in FIG. 2b would be the output transmitted over line 16 to the upper sideband filter 17.

Similarly, operation of the balanced modulator 4 provides a signal modulator output transmitted over line 8 having the spectra shown in FIG. 2c. The spectra shown in FIG. 2c is that which will exist when the keyer 2 is in the position shown generating a signal to be received at the output. When however, the absence of a signal is to be indicated, the keyer is opened thereby shifting oscillator 1 by a predetermined amount which will in turn shift the upper and lower sidebands of the spectra indicated in FIG. 2c by an identical amount. The upper sideband filter 17 and the lower sideband filter 9 operate on the spectra of the reference modulator output and the signal modulator output in FIGS. 2b and 2c respectively to give a transmitted spectra as shown in FIG. 2d. Attenuators 11 and 18 permit adjustment of the relative magnitudes of the components of the transmitted spectra before being added in the adder 10, amplified, and transmitted over projector 22.

The spectra of signals received by hydraphone 24 is, as previously stated, heterodyned by the frequency convertor with local oscillations and the resultant output is shown in FIG. 2e. The signal spectra and the reference noise spectra are separated by operation of the signal channel filter 31 and the reference channel filter 32, the outputs of which, as applied over connections 33 and 34, are respectively illustrated by FIGS. 2f and 2g. Multiplication of the amplitudes of the spectra of signals available from the signal channel filter output and the reference channel filter output gives a multiplier output illustrated as FIG. 2h. This multiplied output is applied over connection 36 of FIG. 1 to the averaging filter 37. The averaging filter is a narrow band averaging filter whose output is illustrated as FIG. 2i. The output of the averaging filter is applied to a threshold detector 39 to give a signal indication or lack thereof dependent on the position of the keyer 2 in the transmitter. When the keyer 2 is opened, oscillator 1 will shift in frequency and all signals dependent thereon will be shifted in frequency. The output from the multiplier will shift outside the bandpass of the averaging filter and the detector will indicate the absence of signal.

The circuitry shown in FIG. 1 transmits a reference noise signal in addition to a signal carrying intelligence. The two signals are correlated at the receiver and synchronization or maintaining of the identity of waveform in time of the noise modulating the signals with the reference noise is not a problem since the noise is derived from a common noise generator. In such a system however, the transmitted reference is available to anyone. Thus, the object, if provided with suitable correlation detection equipment, has the same signal to noise ratio advantage as the intended receiver, and, thus, potential security is lost.

A stored reference system has the advantage of greater security as well as the advantages of the greater signal to noise ratio and better performance in the presence of multi-path propagation than that of the transmitted reference system. However, in a stored reference system, since noise is used as the reference signal, synchronization between the transmitted noise spectra and the spectra stored at the receiver must be provided. The synchronization of the stored signal with the modulating signal in the transmitter must be accomplished during relative movement of the stations which introduces a doppler frequency shift, changes in signal path length between stations caused by changes in the refractive characteristics of the water, and relative variations in the time reference of modulating signal and reference signal such as wow and flutter of magnetic tape when used. An allied problem is that of providing for initial synchronization when the exact instant of signal propagation by one station is unknown to the second. This problem is peculiar to underwater communication because of the long transmit times due to propagation characteristics of water.

It is sometimes advantageous to use two signal sources, one for indicating a mark and the other for indicating space, instead of a frequency shifted oscillator as shown in FIG. 1. FIG. 3 shows such a system employing stored reference signals.

In FIG. 3, there is shown a transmitter and receiver. A mark generator 58 and a space generator 59 are included in said transmitter. Both are noise generators having different waveforms. Keyer 60 applies the signal from one of the two generators to connection 61 in accordance with movement of the contactor. The keyer operates in accordance with the intended message requirement or desired signal for mark or space, which may, in one embodiment, correspond to the signal and pause in code. The keyer can be manually or automatically operated in well known fashion.

The signal applied to modulator 62 by connection 61 is modulated with the continuous waves available from oscillator 63 over lead 64. The modulator 62 is preferably of the type which suppresses the waves supplied over connection 64 and delivers only a single modulation sideband to lead 65.

The modulation sideband signal passes through adder 66 and is applied to amplifier 67 by connection 68. After amplification, the signal is delivered to projector 69 over connection 70.

To provide means for synchronizing the noise generators 59 and 59 with identical noise generators in the receiver a synchronizing generator 71 is provided. The synchronizing generator is preferably of the type supplying a damped oscillation of short duration having a sharp rise time and predetermined frequency of oscillations to the adder 66 over connection 72.

Also provided is a gating circuit 73 which will pass the continuous waves from oscillator 63 to adder 66 over connection 73' for a predetermined time interval. The gating circuit is preferably of the type which will pass a burst of continuous waves from the oscillator for approximately one second for initial frequency setting of oscillator 81 in the receiver. The use of the burst will be more clearly understood by reference to the discussion of synchronism in the receiver.

The signal transmitted by projector 69 is received by hydrophone 74 and applied over connection 75 to amplifier 76. The amplified signal is applied over connection 77 to a frequency limiting filter 78. The filter 78 preferably has a bandpass characteristic as to pass the modulated sideband and the carrier wave transmitted by projector 69.

The frequency limited signal is applied to a mixer 79 over connection 80. The mixer heterodynes the received signal with the signal derived from oscillator 81 over connection 82 to a desired resultant frequency. The heterodyned signal is applied to filter 83 over connection 83'. The filter 83 is preferably of such bandpass as to reject all signals but those attributable to the modulation sideband from the transmitter.

The frequency limited signal from filter 83 is applied to three correlators 84, 85 and 86 over respective connections 87, 88, and 89 and to three space correlators 90, 91 and 92 over respective connections 93, 94 and 95. Each correlator operates to correlate two applied signals and produce a sinusoidal output, the magnitude of which is dependent upon this correlation. In this figure, each correlator comprises the multiplier and averaging filter, explained in connection with FIG. 1 and shown as items 35 and 37 thereon.

The signal with which the received signal is to be correlated is supplied from the mark generator 96 and the space generator. The mark and space generators generate noise signals having the same respective waveforms as the mark and space generators in the transmitter. The mark generator signal, present on connection 98, is delayed by a predetermined time interval by delay 99, delayed by one-half of this first predetermined delay by delay 100, and applied to correlators 84, 85 and 86 over respective connections 101, 102 and 103.

Similarly, the signal from the space generator 97, present on connection 104, is delayed by delays 105 and 106 are applied to space correlators 90, 91 and 92 over respective connections 107, 108, and 109.

If the time base of the mark and space generators is the same, the output signal, derived from correlators 85 and 91 will respectively indicate the presence of a mark and space signal. The mark and space signal, derived as explained with respect to FIG. 1, is transmitted over respective lead 110 to output terminal 111 and lead 112 to output terminal 113.

A feedback circuit is provided to maintain the output frequency of correlator 85 constant in the presence of frequency variations in the received signal, caused, for example by a doppler frequency shift due to relative motion between transmitter and receiver. The feedback circuit comprises the discriminator 114 and frequency controller 115. The signal from correlator 85 is applied over connection 116 and switch contactor 117 to the sharply tuned discriminator 114. The discriminator is tuned to the output frequency of correlator 85 when the system is operating free of doppler frequency shift.

Now, if a doppler frequency shift should be present, the output frequency of correlator 85 will change. The change will cause discriminator 114 to provide an output signal proportional to this change which is applied to connection 118. The signal on connection 118 is applied to a frequency controller 115 which will, in turn, cause a change in the operating frequency of oscillator 81 through connection 119. The sense of this change is such as to restore the heterodyned signal from mixer 79 to the frequency present before the doppler shift. The frequency controller may preferably take the form of a reactance tube controlling the frequency of the stabilized oscillator 81.

In similar manner, the output frequency of correlator 91 is controlled. To ensure that control need is exercised only by the operative correlators, a decision circuit 120 is incorporated. This circuit continually compares the signal amplitude output from the mark correlator 85 and the space correlator 91 derived from respective connections 121 and 122. When the output applied connection 121 is below that applied by connection 122, relay 123 is actuated. Movement of contactor 117 provides for stabilization of the output frequency of space correlator 91, since the control signal, applied to the feedback loop, is derived from the space correlator over connection 124.

Mark correlators 84 and 86 are provided for synchronization of the time base of the mark and space generators 96 and 97 with transmitter mark generator 58. Correlation 84, and 86 are identical with correlator 85. The output signals from correlators 84 and 86 are applied respectively to envelope detectors 125 and 126. The envelope detector will derive an output signal dependent upon the correlation between the applied signals. The envelope detector 125 generates an output signal of one polarity, for example positive, which is applied to adder 127 over connection 128. Detector 126 is adapted to produce a signal of opposite polarity, for example negative, applied to adder 127 over connection 129. The adder 127 adds the two applied signals to give an output signal of zero magnitude when the time base of generator 96 and the signal applied over connection 88 is the same. Error in matching the time base will produce a positive or negative signal, dependent on the direction of error. The error signal is applied over contactor 130 and connection 131 to the time base controller 132. The time base controller 132 operates mark generator 96 through connections 133, 134, and 135 and gating circuit 136. The gating circuit, in this stage of operation provides direct contact between connections 133 and 134. The time base controller may be a reactance tube and associated control oscillator or a differential transformer and associated motor speed controls when electronic noise generators are used, or a variable speed motor control when tape recorders are used for noise generators.

The operation of the time base synchronization may best be understood by reference to FIG. 4 wherein amplitude is plotted as ordinates and time plotted as abscissae. The curve V' is the output of the detector 125, applied to connection 128. Curve V" is the output of detector 126, applied to connection 129. Curve V''' is the output of adder 127 applied to connection 130. It can be seen therefore, that if the signal applied by the connection 88 to correlator 85 is synchronized with the signal applied by lead 102 (having a ½fc delay) no signal will be developed. Lack of synchronism will generate a signal which is used to correct and maintain synchronism.

Referring again to FIG. 3, a similar synchronization arrangement is provided for control of the space generator time base, wherein detectors 137 and 138, adder 139, and connections 140 and 141 are identical with and operate the same as the respective detectors 125 and 126, adder 127, and connections 131 and 135 in the mark correlator circuit. Control of the proper generator is effected by operation of relay 123 as explained previously. Since the time base of both the mark and space generators are continuously adjusted by operation of either the mark or space correlator synchronizer, transfer of synchronization control from mark to space may be made without loss of synchronization.

For initial synchronization, it is necessary to start generators 96 and 97 at the same time that the signal first arrives at the receiver and at a known point in the predetermined waveform transmitted. The starting point in the predetermined waveform of generators 58, 59, 96 and 97 is maintained the same before transmission and reception. Starting the generators at the same time is accomplished by a synchronizing pulse. The transmitter provides a synchronizing pulse by synchronizing generator 71 at the start of operation of the mark and space generator 58 and 59. In order to utilize this pulse at the receiver, the received signal is applied to connection 142 from amplifier 76. Filter 143 is a frequency limiting filter which passes only the synchronizing signal to connection 144. The signal operates on the gate circuit to permit passage of signals from connection 133 to 134. The generators 96 and 97 are started when the gate 136 is opened. The gate circuit can be conventional electronic gate when generators 96 and 97 are electronic noise generators and the controller 132 contains a control oscillator. The gate would take the form of a clutch, such as an electromagnetically operated clutch, when the noise generators are magnetic tape and the controller is a variable-speed motor drive.

The fact that the synchronization pulse causes both the transmitter and receiver generators to have the same starting point, does not necessarily provide that a signal will appear at the correlator output which can be used to synchronization. Frequency shifts in the received signal, as for example a strong doppler frequency shift, would cause corresponding frequency shift in the multiplier output sine wave. The resultant frequency of the multiplier output could easily fall outside of the bandpass of the averaging filter. This would cause the output of the correlators to disappear even in presence of synchronism, and maintenance of synchronization by correlator control would be impossible. Therefore, it is desirable to provide added means for frequency control.

For this purpose a carrier frequency burst, initiated at the same time as or slightly before the transmitter generators is transmitted. The burst is generated by oscillator 63 and gate 73. The carrier burst superimposed on the noise signal is applied to connection 145 after amplification frequency limiting and mixing. The signal is frequency limited by filter 146 which passes only the signal due to the carrier burst signal, and is impressed on discriminator 114 over connection 147. The discriminator 114, controller 115, and oscillator 81 operated as previously described to cause the signals impressed on correlators 84, 85, 86, 90, 91 and 92 to have the proper frequency for operation of synchronization control by the correlators as described previously. The carrier burst is maintained for a sufficient time to allow such correction. Thereafter, synchronization by correlator operation is effective and the burst is cut off by gate 73.

In one embodiment, noise generators 58, 59, 96 and 97 had spectra in the frequency range 50–500 cycles per second. Oscillator 63 operated at 10 KC. The synchronizating generator 71 generated a 2 milli-second damped oscillation at 8.0 to 8.5 KC. The gate 73 admitted a burst of the carrier to the adder for 1 second. The synchronizing generator 71 and generators 58 and 59 were started simultaneously and during the carrier burst. In the receiver, filter 143 had a bandpass from 8 to 8.5 KC to pass only the synchronization pulse. Filter 78 had a bandpass from 9.5 to 10 KC. Oscillator 81 operated at 1 KC when running without control by the frequency controller 115. The filter 146 had a bandpass 9002.5±6 cycles per second to pass only the heterodyned carrier burst. Filter 83 had a bandpass of 8.5 to 9 KC. Correlators 84, 85, 86, 90, 91 and 92 had a bandpass of 9002.5±0.5 cycles per second. Delays 99 and 105 introduced a delay of 1/fc where fc is the spectral band width of the noise generators. Delays 100 and 106 introduced a delay of ½ fc.

While particular embodiments of the present invention have been shown and described, it will be obvious to those skilled in the art that changes and modifications may be made without departing from the invention in its broader aspects and, therefore the aim in the appended claims to cover all such changes and modifications as fall within the true spirit and scope of this invention.

What we claim as new and desire to secure by Letters Patent of the United States is:

1. In combination, means to generate a first noise signal having predetermined characteristics, means to generate a second noise signal have predetermined characteristics different from that of said first noise signal, means to generate a carrier wave, means to generate a message signal, means to modulate said first noise signal with said carrier wave in the presence of said message signal to derive a first modulated wave, means to modulate said second noise signal with said carrier wave in the absence of said message signal to derive a second modulated wave, means to suppress said carrier wave in said first and second modulated wave, means to transmit at least one sideband of said first or second modulated wave, means to receive said transmitted wave, means for generating a second carrier wave, means for heterodying said received wave against said second carrier to derive a resultant signal of desired frequency, means for generating a third noise signal having the same amplitude characteristics as said first noise signal on a controllably variable time base, means for generating a fourth noise signal having the same amplitude characteristics as said second noise signal on a controllably variable time base, means for starting said third and fourth noise generators at the same point on the predetermined characteristic as the first and second noise generators, means for starting said third and fourth noise generators at a time determined by reception of said received wave, means for controlling the time base of said third and fourth noise signal to be identical with the time base of said first and second noise signal as received by the receiver, means for correlating said received wave with said third and fourth noise generator to derive said message signal.

2. In combination, means to generate a first noise signal having predetermined amplitude characteristics, means to generate a carrier wave, means to generate a message signal, means to modulate said first noise signal with said carrier wave in respect to said message signal to derive a modulated wave, means to transmit at least one side band of said modulated wave, means to receive said transmitted wave, means for generating a second carrier wave, means for heterodyning said received wave against said second carrier to derive a resultant signal of desired frequency, means for transmitting a carrier burst signal at the initiation of a message signal, means for receiving said carrier burst, means for heterodyning said carrier burst against said second carrier to derive a resultant signal of desired frequency upon initiation of a message signal, means for generating a second noise signal having the same amplitude characteristics as said first noise signal on a controllably variable time base, means for starting said second noise generator at the same point on the predetermined characteristic as said first noise generator, means for starting said second noise generator at a time determined by reception of said received wave, means for controlling the time base of said second noise signal to be identical with the time base of said first noise signal as received by the receiver, means for correlating said received wave with said second noise generator to derive said message signal.

3. A noise modulated correlation system comprising transmission means for transmitting a noise modulated signal, means for receiving said noise modulated signal to provide a received signal, a source of reference noise signal, a carrier frequency wave source for generating a sine wave signal, means for heterodyning said sine wave signal with said received signal to derive a resultant signal, correlation means for correlating said resultant signal and said reference noise signal, means for applying said resultant signal and said reference noise signal to said correlation means, means for initially setting from said transmission means the frequency of said resultant signal comprising means for transmitting a burst of sine waves, means for receiving said burst of sine waves, means for applying the received burst of sine waves to said carrier frequency source to initially set the frequency of said sine wave signal, means for continuously controlling the frequency of said resultant signal comprising means for applying the output signal of said correlation means to said carrier frequency wave source for controlling the frequency of said sine wave signal.

* * * * *